US007054829B2

(12) United States Patent
Campo et al.

(10) Patent No.: US 7,054,829 B2
(45) Date of Patent: May 30, 2006

(54) METHOD AND SYSTEM FOR VALIDATING VOTES

(75) Inventors: John L. Campo, Vienna, VA (US); David T. Nassef, Alexandria, VA (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 254 days.

(21) Appl. No.: 10/335,469

(22) Filed: Dec. 31, 2002

(65) Prior Publication Data

US 2004/0128190 A1 Jul. 1, 2004

(51) Int. Cl.
*G06F 17/60* (2006.01)

(52) U.S. Cl. ............................ 705/12; 705/51; 705/60; 235/50 B; 235/50 R; 235/51; 235/54 F; 235/56; 235/57; 235/386

(58) Field of Classification Search .................. 705/12, 705/1, 50–80; 235/386, 51, 56, 50 B, 50 R, 235/54 F, 57
See application file for complete search history.

(56) References Cited

U.S. PATENT DOCUMENTS

| | | | | |
|---|---|---|---|---|
| 4,641,240 | A | 2/1987 | Boram | |
| 4,717,177 | A | 1/1988 | Boram | |
| 5,189,288 | A | 2/1993 | Anno et al. | |
| 5,218,528 | A | 6/1993 | Wise et al. | |
| 6,009,149 | A * | 12/1999 | Langsenkamp | 379/69 |
| 6,250,548 | B1 | 6/2001 | McClure et al. | |
| 6,314,519 | B1 * | 11/2001 | Davis et al. | 713/200 |
| 6,457,643 | B1 | 10/2002 | Way | |
| 6,540,138 | B1 * | 4/2003 | Hall et al. | 235/386 |
| 2001/0035455 | A1 * | 11/2001 | Davis et al. | 235/375 |
| 2002/0019767 | A1 * | 2/2002 | Babbitt et al. | 705/12 |
| 2002/0077886 | A1 * | 6/2002 | Chung | 705/12 |
| 2002/0128978 | A1 * | 9/2002 | Neff | 705/64 |
| 2002/0133396 | A1 * | 9/2002 | Barnhart | 705/12 |
| 2002/0138341 | A1 * | 9/2002 | Rodriguez et al. | 705/12 |
| 2003/0062411 | A1 * | 4/2003 | Chung et al. | 235/386 |

* cited by examiner

*Primary Examiner*—James Trammell
*Assistant Examiner*—Bradley B. Bayat
(74) *Attorney, Agent, or Firm*—Brian A. Lemm; Angelo N. Chaclas

(57) ABSTRACT

A method and system for validating the creation and submission of absentee ballots is provided. An authentication/validation mark is generated and printed on an absentee ballot and/or the envelope that contains the absentee ballot. The authentication/validation marks include information such as, for example, the date and time of printing, an identification and location of the vote validator that generated and printed the mark, a unique identifier of the mark, and a digital signature of the authentication/validation data. Upon receipt of the absentee ballot by election officials, the authentication/validation marks printed on the absentee ballot and/or envelope containing the ballot can be verified by authenticating the digital signature and verifying the validity of the data in the mark. If the mark is verified, the authenticity and creation/submission dates of the absentee ballot are guaranteed and the absentee ballot can be accepted as a valid absentee ballot for election purposes.

51 Claims, 4 Drawing Sheets

METHOD AND SYSTEM FOR VALIDATING VOTES

FIELD OF THE INVENTION

The invention disclosed herein relates generally to voting systems, and more particularly to a method and system to authenticate and verify ballots.

BACKGROUND OF THE INVENTION

In democratic countries, governmental officials are chosen by the citizens in an election. Voting for candidates for public office in the United States is typically performed utilizing mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, typically based on the voter's residence. If an individual is unable to go to the polling place at which he is registered, an absentee ballot can be utilized to allow the individual to cast his vote. There are numerous reasons a person may be unable to attend his registered polling place on an election day, including, for example, business or pleasure travel, attending school in a different location, or military service in a remote location. Typically, the user of an absentee ballot selects his choices on a ballot and returns the ballot to the election officials by mail.

While the use of absentee ballots allows all citizens to participate in the democratic process even if they are unable to attend their specific polling place on the day of the election, there are problems with the use of absentee ballots. A very important criteria of any voting system is the accuracy and security of the ballots to ensure that all ballots comply with applicable election laws. Any ballots that are not in compliance should not be counted, while all ballots that are in compliance should be counted. For example, for absentee ballots to be valid, the ballot must have been created, i.e., completed by the voter, in a timely manner and submitted for return to the election officials. For example, an absentee ballot that is created and/or mailed subsequent to the election day should not be counted.

The current method for ensuring timely completion and submission of absentee ballots relies either on a manually applied stamp indicating the date of completion and/or the United States Post Office (USPS) cancellation mark on the mail piece containing the absentee ballot indicating the date of submission. Neither of these methods, however, is completely verifiable or accurate, and tampering can easily be accomplished. The inability to verify and/or inaccuracy of these conventional methods typically results in numerous absentee ballots being declared invalid, and thus not counting. The adage "every vote counts" was made clear in the last presidential election, in which the voting was very close, and numerous absentee ballots, including ballots from overseas military personnel, were declared invalid due to questions about timely completion and submission. In some cases, it is possible that absentee ballots that were properly created and submitted can still be declared invalid if any questions arise, since as noted above, there is no method for ensuring the timely creation and submission of absentee ballots that is completely verifiable or accurate. If an election is very close, it is especially important that all properly created and submitted votes be counted, including any absentee ballots.

Thus, there exists a need for a method and system that can accurately verify the creation and submission of an absentee ballot.

SUMMARY OF THE INVENTION

The present invention alleviates the problems associated with the prior art and provides a method and system for validating the creation and submission of absentee ballots.

In accordance with the present invention, a vote validation system is provided in which an authentication/validation mark is generated and printed on an absentee ballot and/or the envelope that contains the absentee ballot. The validation system includes one or more vote validator devices that generate and print the authentication/validation marks. The authentication/validation marks include information such as, for example, the date and time of printing, an identification and location of the vote validator that generated and printed the mark, a unique identifier of the mark, and a digital signature of the authentication/validation data. The vote validation system can further include a database that stores records related to each of the vote validators in the system, and can optionally maintain audit reports of all authentication/validation marks printed. The vote validation system further includes a verification system for use by election officials. Upon receipt of the absentee ballot by election officials, the authentication/validation marks printed on the absentee ballot and/or envelope containing the ballot can be verified by authenticating the digital signature and verifying the validity of the data in the mark such as, for example, by comparing the data contained in the mark with the data stored in the database maintained by the vote validation system. If the mark is verified, the authenticity and creation/submission dates of the absentee ballot are guaranteed and the absentee ballot can be accepted as a valid absentee ballot for election purposes. The vote validation system of the present invention can significantly reduce the number of absentee ballots declared invalid due to questions about the creation and submission of an absentee ballot.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
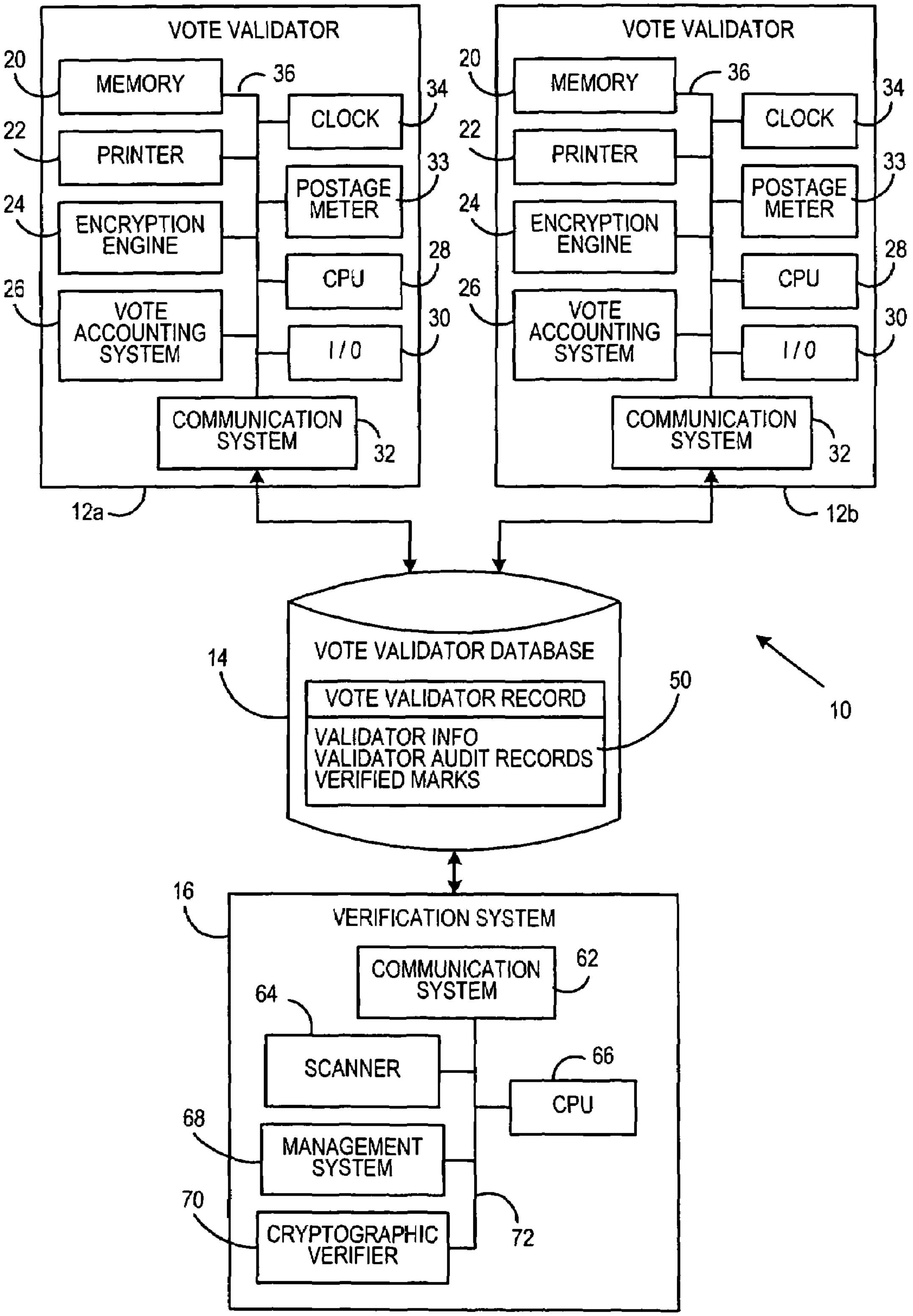
FIG. 1 illustrates in block diagram form a vote validation system according to the present invention.

In describing the present invention, reference is made to the drawings, wherein there is seen in FIG. 1 a vote validation system 10 according to the present invention. System 10 includes one or more vote validators 12*a*, 12*b*. While two vote validators 12*a*, 12*b* are illustrated in FIG. 1, it should be understood that any number of vote validators may be provided. The construction and operation of each of the vote validators 12*a*, 12*b* is substantially identical, therefore, for conciseness, the remaining description will refer to only a single vote validator 12*a*, with it being understood that the operation as described with respect to vote validator 12*a* is also applicable to any other vote validators, such as, for example, vote validator 12*b*, included in the system 10. Vote validator 12*a* is preferably a portable device that can be utilized by election authorities in remote, overseas or other absentee ballot environments. Vote validator 12*a* is preferably assigned to a local election authority for a specific region for a specific election period. Thus, for example, a vote validator 12*a* could be located at overseas embassies or military bases, or any other area where there is substantial use of absentee ballots. A vote validator 12*a* could also be located at major polling locations such that any voter wishing to submit an absentee ballot to another local election authority could have their absentee ballot verified. Thus, for example, if a person is registered to vote in the state of Connecticut, but will be in the state of Virginia on election day, he could obtain an absentee ballot from his local jurisdiction in Connecticut, complete the form in Virginia, and bring it to a polling location that has a vote validator 12*a* in Virginia. The absentee ballot can be processed, as described below, by the vote validator 12*a* in Virginia and returned to Connecticut. The processing of the ballot by vote validator 12*a* will ensure that the creation and submission of the ballot is verifiable and the ballot will not be declared invalid. The number of vote validators 12*a*, 12*b* included in the system 10, therefore, is dependent upon the number of locations from which election officials desire to verify absentee ballots.

Vote validator 12*a* preferably includes a memory 20, a printer 22, an encryption engine 24, a vote accounting system 26, a central processing unit (CPU) 28, an input/output device 30, and a communication system 32. Vote validator 12*a* can also include a secure real-time date/time clock 34, which provides the date and optionally the time to processor 28. Alternatively, vote validator 12*a* could communicate with an external clock, such as, for example, via a network, to receive the date and time. Each of the above components communicate via a bus 36. The operation and function of the vote validator 12*a* is controlled by CPU 28. Memory 20 is preferably a non-volatile memory that stores information utilized by the vote validator 12*a*, including, for example, identification information, state information, and audit data as described below. Memory 20 further stores a private cryptographic key that can be utilized in the generation of a digital signature. The corresponding public key, utilized to verify the signature generated using the private key, can be obtained in a traceable, verifiable manner to ensure the integrity of the key pair. This can be achieved using any type of well known key management methods, including, for example, standard Public Key Infrastructure (PKI) methods. Printer 22 is preferably a secure printing system that is utilized to print an authentication/validation mark (described below), generated by vote validator 12*a*, on an absentee ballot and/or an envelope that contains an absentee ballot. Optionally, printer 22 can also print a postage indicium that evidences payment of postage on an envelope. Alternatively, printer 22 could print the authentication/validation mark, and postage indicium, if provided, on a tape or label that is affixed to the absentee ballot and/or envelope containing an absentee ballot. Encryption engine 24 generates a digital signature, using a cryptographic key stored in memory 20, for signing the data contained in the authentication/validation mark. Vote accounting system 26 creates a unique identifier for each authentication/validation mark generated by the vote validator 12*a*. Preferably, the portions of bus 36 that couple the printer 22, encryption engine 24, and vote accounting system 26 are secure physical links to prevent any tampering with the printing, signing or accounting for authentication/validation marks generated by the vote validator 12*a*. Alternatively, the links may be secured cryptographically using a secure cryptographic protocol such as, for example, Secure Socket Layer (SSL). Input/output device 30 may be, for example, a keyboard and/or display device that can be utilized by an operator to input information into or retrieve information from the vote validator 12*a*. Communication system 32 can be any type of conventional communication system, such as, for example, a modem for connection to a telephone system, or other type of network connection, such as, for example, an Internet connection. Communication system 32 allows the vote validator 12*a* to communicate data to other parts of the system 10 as described below. Preferably, the communications from communication system 32 are encrypted and/or signed to protect the content of the communications.

Optionally, vote validator 12*a* may include a postage meter 38 for generating postage indicia that evidences payment of postage for the envelope in which an absentee ballot is returned.

Vote validator 12*a* generates a unique authentication/validation mark (hereinafter referred to as the mark or validation mark) for each absentee ballot and/or envelope processed. A mark is provided on the respective absentee ballot and/or on an envelope in which the absentee ballot will be returned. The mark is printed evidence of authenticity of the ballot. The mark contains information in a machine readable format, and is preferably cryptographically protected. The mark may be formatted as a two dimensional barcode, such as, for example, the well known PDF 417 format from Symbol Technologies Corporation, or any other suitable, sufficiently dense, printed, scanable form of data representation, such as, for example, DataMatrix. The encoded information in the mark preferably includes error correction and/or detection codes.

The information provided in the mark can include, for example, graphics that identify the mark as a vote authentication/validation mark and an identification of the vote validator 12*a* used to print the mark. This information can be stored, for example, in memory 20 of vote validator 12*a*. The information included in the mark can further include the unique identifier of the mark generated by the vote accounting system 26. Preferably, the unique identifier is a pseudorandom number that is guaranteed not to repeat. Thus, every mark will be identifiable and no two marks will be exactly the same. Furthermore, the identifier is preferably not based on, or should not disclose, the order in which the ballot was processed, such that it is difficult to determine the identity of the voter based on the order of the processing. In this manner, the secrecy of the ballot can be further protected. The information in the mark preferably further includes the date and optionally the time of processing, as provided by the clock 34, and a digital signature, generated by encryption engine 24, of the data included in the mark. The time of processing, if provided, should be precise enough to guarantee that the ballot was completed as created and/or submitted in a timely manner, but not so precise that it gives the exact order of the processing of the ballot and/or envelope. The information in the mark can also include an identification of the authorized location of the vote validator 12*a*, or an identification of the local election authority to which the vote validator 12*a* is assigned. Optionally, the mark may be provide with graphic security properties to make duplication or replication of the mark difficult. Such security properties could include, for example, the use of special inks, watermarks and steganography as described in U.S. Pat. Nos. 6,284,027, 6,70,213, 6,039,257 and 5,693,693, which are hereby incorporated by reference.

Vote validator 12*a* can also generate audit records or reports for use in evaluating and verifying the proper use of the vote validator 12*a*. The audit report could include, for example, the identification of the vote validator 12*a*, the date and time the last audit report was prepared and historical data related to previous audit reports, the date and time of the current report, and state information of the vote validator 12*a*. Such state information could include, for example, the date of a last physical inspection of the vote validator 12*a*, authorization information for the vote validator 12*a*, i.e., the local election authority to which the vote validator 12*a* is assigned, tamper indication, i.e., if any of the components of the vote validator 12*a*, especially those coupled by secure links, have been tampered with or attempted to be tampered with, and any previous checks or resets performed on clock 34. The audit report further includes information related to each authentication/validation mark generated during the current reporting period, such as, for example, the unique identification of each of the marks generated. Preferably, the audit reports are signed with a digital signature generated utilizing the private key stored in the memory 20 of vote validator 12*a*. The audit reports can be transmitted in either a printed form or electronically for use in verifying the operation of the vote validator 12*a* as described further below.

Referring again to FIG. 1, system 10 further preferably includes a database 14. Vote validator 12*a* communicates with the database 14 via the communication system 32, and provides data to the database 14. As noted above, the communication between the database 14 and vote validator 12*a* could be via a telephone system or network connection. Other types of communications could also be utilized, including, for example, wireless communications. Optionally, if no electronic communication systems are available, vote validator 12*a* could also produce printed reports that can be mailed to database 14 and the data input locally at database 14.

Database 14 maintains a record 50 for each vote validator based on the data received from each vote validator, such as vote validator 12*a*, included in the system 10. Each record 50 includes information related to the vote validator. Thus, the record 50 for vote validator 12*a* may include, for example, an identification of the vote validator 12*a*, which may be a serial number or the like, the corresponding verification keys used to verify the signature created by the encryption engine 24 of the vote validator 12*a*, the location of the vote validator 12*a*, an archive of all the marks previously generated by vote validator 12*a* that have already been verified (as described below), and an archive of all audit records and reports generated by vote validator 12*a*.

System 10 further includes a verification system 16. Verification system 16 includes a communication system 62 that allows verification system 16 to communicate with database 14 and obtain information from the database 14. Optionally, verification system 16 may also communicate directly with each vote validator 12*a*, 12*b* in the system 10. The communications may be conducted, for example, via a telephone or other data network, and may be wireless. Verification system 16 further includes a scanner 64, a central processing unit (CPU) 66, a management system 68, and a cryptographic verifier 70. Each of the above components communicate via a bus 72. The operation and function of the verification system 16 is controlled by CPU 66. Scanner 64 is utilized to read the mark generated by vote validator 12*a* that is printed on an absentee ballot and/or envelope containing an absentee ballot. Generally, scanner 64 can be any type of conventional scanner, whether based on laser, CCD or some other technology. Cryptographic verifier 70 authenticates the digital signature, utilizing the corresponding public key to the private key used to generate the signature, of the mark generated by the encryption engine 24 of the vote validator 12*a*. CPU 66 is further utilized to verify the validity of the data contained within the mark as described below.

Management system 68 provides management functions related to each of the vote validators 12*a*, 12*b* within the system 10 and verification of the audit reports, previously described, generated by the vote validators 12*a*, 12*b*. For example, when an audit report from vote validator 12*a* is received by verification system 16, either in printed form or electronically, the verification system 16 obtains the corresponding vote validator record, e.g., record 50, from the database 14. Optionally, error correction can be applied to the audit report to assist in the recovery of information contained therein if necessary. The verification system 16 then verifies the digital signature of the audit report, utilizing the cryptographic verifier 70 as described above, and if the signature is verified, management system 68 will then check the information contained within the audit report against the information contained in the vote validator record 50. In this manner, the operation of the each of the vote validators with the system 10 can be verified to ensure that tampering is not occurring. Such audit reports can be performed at any periodic time intervals desired, such as, for example, daily, weekly or monthly.

Figure 2:
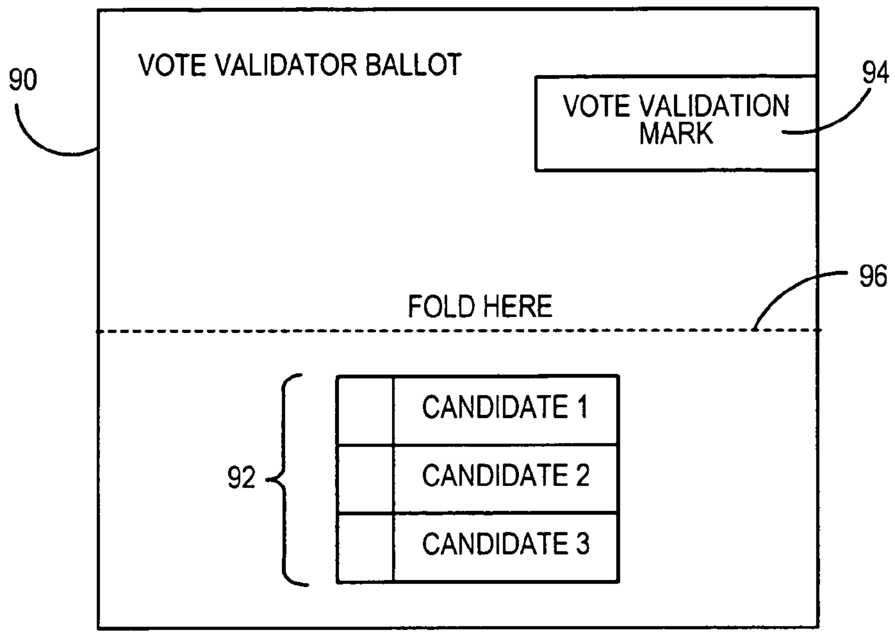
FIG. 2 illustrates an example of a voting ballot that can be used with the vote validation system according to the present invention.

Referring now to FIG. 2, there is illustrated an example of a voting ballot 90 that can be utilized with the vote validation system 10 according to the present invention. Ballot 90 includes an area 92 that lists the candidates from which the voter utilizing the ballot 90 may select, along with a place to mark his vote adjacent to each candidate. Ballot 90 further includes an area 94 to print the authentication/validation mark, described above, that is generated by the vote validator 12*a*. The mark printed on the ballot 90 authenticates the date and location of completion: of the ballot 90. Preferably, to ensure the privacy and secrecy of the ballot 90, the ballot 90 can be folded in such a way that the voter's selections are not visible, yet the ballot can still be processed by vote validator 12*a* as described below. Thus, for example, ballot 90 could be folded along line 96 such that the selection area 92 is concealed but the area 94 for the mark is still visible. Alternatively, of course, the ballot 90 could be folded in half and the mark printed on the outside of the ballot 90, or any other appropriate method of concealing the voter's selections could be utilized.

Figure 3:
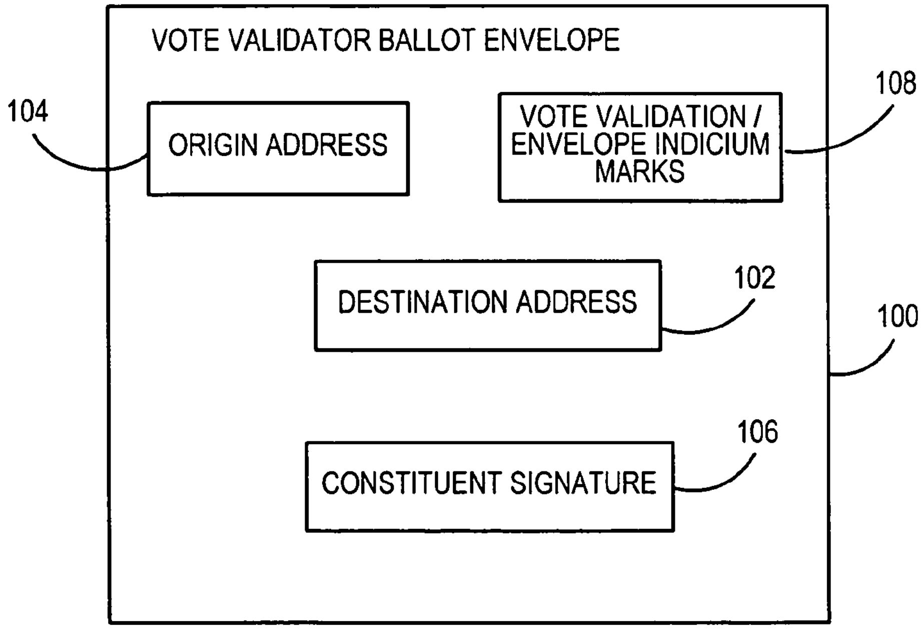
FIG. 3 illustrates an example of a voting ballot envelope that can be used with the vote validation system according to the present invention.

Referring now to FIG. 3, there is illustrated an example of an envelope 100 that can be utilized with the vote validation system 10 of the present invention. Envelope 100 is intended to contain an absentee ballot, such as, for example the ballot 90 of FIG. 2. Envelope 100 includes an area 102 for the destination address, i.e., the election authority to which the envelope 100 will be returned. Envelope 100 also includes an area 104 for the origin address, i.e., the location from which the envelope 100 is being sent. Envelope 100 may also include an area 106 for the signature of the voter returning the envelope 100. Envelope 100 further includes an area 108 to print an authentication/validation mark, described above, that is generated by the vote validator 12*a*. The same mark can be printed on both the envelope 100 and the ballot 90, or alternatively a different mark could be generated for each of the ballot 90 and envelope 100. Optionally, if it is not desired to verify the date and location of completion of the ballot 90, but only to verify the date and location of submission of the envelope 100, only a single mark need be generated by the vote validator 12*a* and printed on the sealed envelope 100 containing the ballot 90. If vote validator 12*a* includes the optional postage meter 38, the area 108 could also be utilized to print the postage indicium for the envelope 100 to evidence payment of postage for the envelope 100. The postage indicium and authentication/validation mark are preferably printed simultaneously as the envelope 100 is processed by the vote validator 12*a*. Alternatively, instead of having two separate marks, i.e., an authentication/validation mark and a postage indicium, these marks could be integrated into a single mark such that the authentication/validation mark could concurrently serve as the postage indicium. It should be noted that if separate marks are provided, they could be printed in different areas of the envelope 100 instead of both marks being printed in area 108. For example, the marks could be printed on opposite sides of the envelope 100. Additionally, the authentication/validation mark could be printed across the sealed flap of the envelope 100, thereby providing an indication of tampering.

Figure 4:
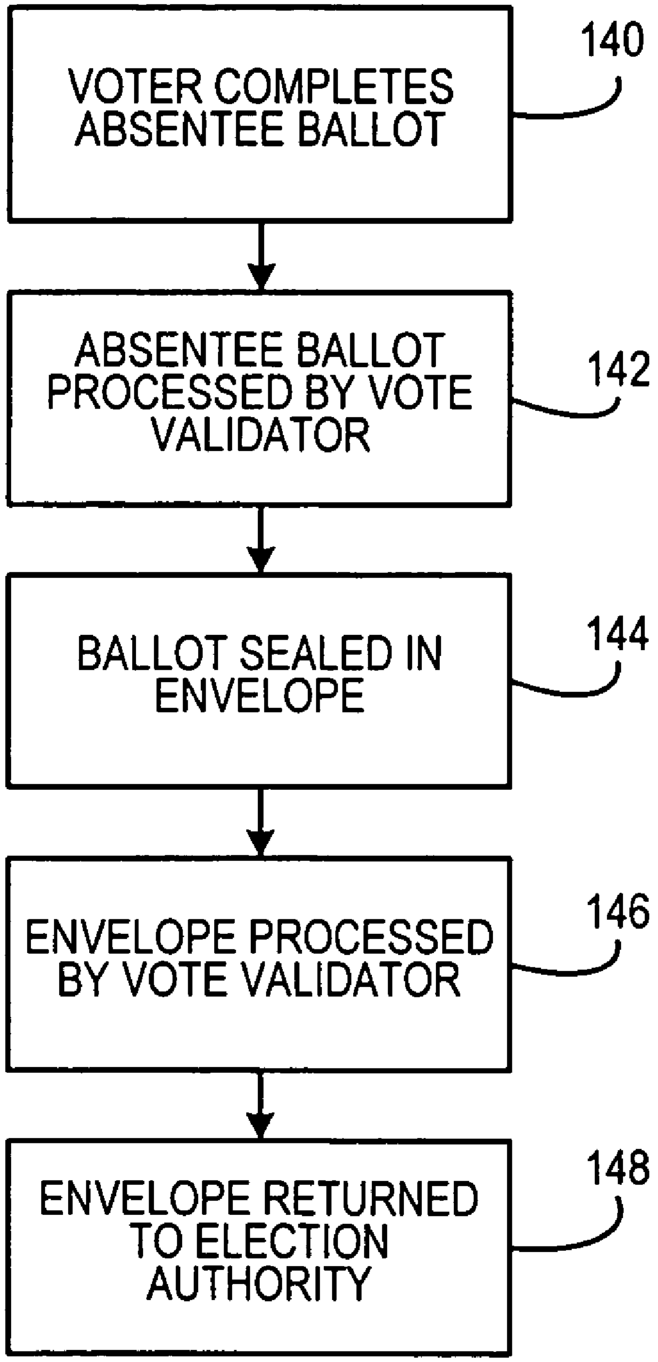
FIG. 4 illustrates in flow diagram form the processing of an absentee ballot, including the generation of one or more authentication/validation marks, according to the present invention.

Referring now to FIG. 4, there is illustrated in flow chart form the processing of an individual absentee ballot, such as, for example, ballot 90, including the generation of an authentication/validation mark according to the present invention. In step 140, the voter completes the ballot 90 by making one or more selections for the candidate(s) of his choice. The voter can preferably conceal his selections by folding the ballot 90 as previously described or by some other appropriate concealment method. Optionally, if it is desired to verify the date and location of completion of the ballot 90, then in step 142 the ballot 90 is processed by the vote validator 12*a*. Such processing includes the generation of an authentication/validation mark as previously described and printing of the mark on the ballot 90 or on a label that is affixed to ballot 90. The mark on the ballot 90 authenticates the date and location of completion of the voter's ballot 90. As noted above, the mark includes a unique identifier that can identify the ballot 90, but cannot be used to identify the voter to maintain the secrecy of the voter's selections. In step 144, the ballot 90 is sealed in an envelope, such as, for example, envelope 100, and optionally the voter signs the envelope 100 in the signature area 106. In step 146, the envelope 100 is processed by the vote validator 12*a*, including the generation and printing of a vote validation mark and optionally a postage indicium mark in the area 108 of envelope 100 or on a label affixed to envelope 100 in the area 108. As noted above, the mark generated for the envelope 100 may be the same as the mark generated for the ballot 90 or may be a different mark. The mark on the envelope 100 authenticates the date and location that the sealed envelope 100 was submitted for return to the election authority. In step 148, the envelope 100 is returned to the election authority, such as, for example, by mail.

Figure 5:
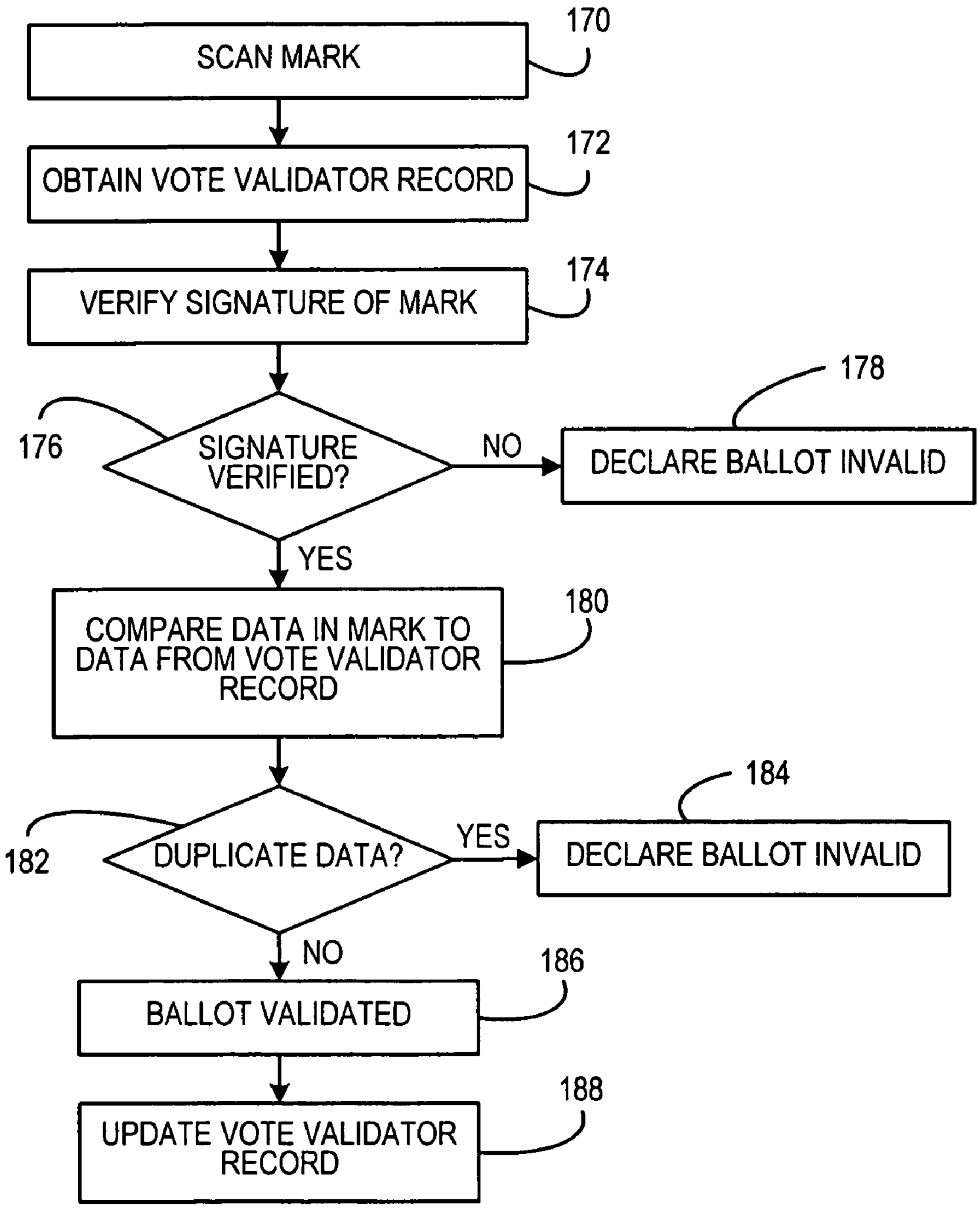
FIG. 5 illustrates in flow diagram form the verification of an envelope and/or absentee ballot having an authentication/validation mark according to the present invention.

Referring now to FIG. 5, there is illustrated in flow diagram form the verification of an envelope 100 and/or absentee ballot 90 having an authentication/validation mark according to the present invention. The processing as described in FIG. 5 can be performed on each of the envelope 100 and the ballot 90 if both are provided with a mark. For conciseness, the description of FIG. 5 will be based on only a single mark, with it being understood that the processing can be repeated for each mark separately. Upon receipt by the local election authority, in step 170 the mark is scanned and the data contained within the mark is retrieved. If the data in the mark is encrypted, then the retrieval of the data also includes decrypting the data. In addition, data retrieval could also include the application of error correction and detection codes to remove any errors. Once the mark has successfully been read and the data retrieved, then in step 172 the verification system 16, utilizing the data contained within the mark, obtains the corresponding vote validator record 50 from data base 14. This is performed, for example, based on the identification of the vote validator 12*a* included in the mark. Alternatively, if the verification system 16 communicates directly with the vote validator 12*a*, information can be obtained directly from the vote validator 12*a*.

Once the corresponding vote validator record 50 has been obtained by the verification system 16, then in step 174 the cryptographic verifier 70 will verify the signature of the mark. Verification of the signature provides assurance that the mark was properly generated by vote validator 12*a* and is not a counterfeit mark. If the signature is not verified, then in step 178 the ballot will be declared invalid, or alternatively the ballot can be set aside for further inspection. If in step 176 the signature is verified, then in step 180 the data retrieved from the mark is verified by comparing it with the data obtained from the vote validator record 50. Such comparison can be performed, for example by CPU 66. Specifically, the data is compared to determine if the scanned mark is a duplicate mark of one already verified. This is performed, for example, based on the unique identifier generated by the vote accounting system 26 that is included in each mark. Thus, the unique identifier of the scanned mark can be compared against the archive of all marks previously generated by vote validator 12*a* that have already been verified that is included in the vote validator record 50. Optionally, the unique identifier of the scanned mark can be compared against the audit record from vote validator 12*a* to ensure that the vote validator 12*a* previously created the mark.

If in step 182 it is determined that the mark is a duplicate mark or was not properly generated by the vote validator 12*a*, then in step 184 the ballot will be declared invalid, or alternatively the ballot can be set aside for further inspection. If in step 182 it is determined that the mark is not a duplicate mark and that the mark was properly generated by vote validator 12*a*, then in step 186 the ballot/envelope is validated, i.e., the date and location of creation and/or submission of the ballot/envelope is verifiable. Accordingly, it can be accurately and indisputably determined, based on the validation of the ballot/envelope, whether or not the creation and/or submission of the ballot/envelope was timely and in compliance with applicable vote creation/submission regulations. In step 188 the vote validator record 50 is updated to include the just verified mark in the archive of all marks previously generated by vote validator 12*a* that have already been verified.

Thus, according to the present invention, a method and system for validating the creation and submission of absentee ballots is provided. A vote validation system is provided in which an authentication/validation mark is generated and printed on an absentee ballot and/or the envelope that contains the absentee ballot. Upon receipt of the absentee ballot by election officials, the authentication/validation marks printed on the absentee ballot and/or envelope containing the ballot can be verified to ensure the authenticity and creation/submission dates of the absentee ballot. Those skilled in the art will also recognize that various modifications can be made without departing from the spirit of the present invention. For example, envelope 100 could be a window envelope such that the mark on the ballot 90 is visible through the window in the envelope 100. In this manner, only a single mark needs to be generated and placed on the ballot 90. The voter could thus submit the absentee ballot 90 to the remote location in which the vote validator 12*a* is located. The voting personnel at that location could process the ballot through the vote validator 12*a*, seal the envelope, have the voter sign the envelope, and then submit the envelope for return to the voter's local election authority. Thus, the single mark provided on the ballot 90 authenticates the date and location of creation and submission of the ballot 90. Of course, this scenario relies on the voting personnel at the remote location to seal and submit the envelope when the ballot 90 was actually completed, and as such is not as secure as if the envelope is processed after being sealed and a mark is provided for the envelope.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for validating an absentee ballot comprising:

generating a validation mark with a vote validator device, the validation mark including data associated with the validation mark and an identification of the vote validator device;

signing the validation mark with a digital signature;

applying the validation mark to at least one of the absentee ballot or an envelope containing the absentee ballot;

receiving the absentee ballot or the envelope containing the absentee ballot at a verification system;

scanning, at the verification system, the validation mark applied to the absentee ballot or the envelope containing the absentee ballot;

verifying the digital signature of the validation mark; and if the digital signature is verified, verifying at least a portion of the data included in the validation mark, wherein if the at least a portion of the data included in the mark is verified, the absentee ballot is validated.

2. The method of claim 1, wherein generating a validation mark further comprises:

generating a unique identifier for the validation mark, wherein the data associated with validation mark includes the unique identifier.

3. The method of claim 2, wherein the data associated with the validation mark further includes a date the validation mark was generated.

4. The method of claim 1, wherein generating the validation mark further comprises:

encrypting the data included in the validation mark.

5. The method of claim 4, wherein scanning further comprises:

decrypting the data included in the validation mark.

6. The method of claim 1, wherein signing the validation mark further comprises:

signing the validation mark utilizing a private key.

7. The method of claim 6, wherein verifying the digital signature further comprises:

verifying the digital signature utilizing a public key that corresponds to the private key.

8. The method of claim 1, wherein applying the validation mark further comprises:

printing the validation mark on at least one of the absentee ballot or the envelope containing the absentee ballot.

9. The method of claim 8, wherein printing the validation mark on the envelope containing the absentee ballot further comprises:

printing the validation mark across a sealed flap of the envelope.

10. The method of claim 8, wherein the printed validation mark is provided with a graphical security property.

11. The method of claim 1, wherein applying the validation mark further comprises:

printing the validation mark on a label for affixing to at least one of the absentee ballot or the envelope containing the absentee ballot.

12. The method of claim 1, wherein verifying at least a portion of the data further comprises:

obtaining an information record based on the data associated with the validation mark; and comparing the at least of portion of the data included in the validation mark with data included in the information record.

13. The method of claim 12, wherein if the at least a portion of the data included in the validation mark is a duplicate of data included in the information record, the at least a portion of data included in the validation mark is not verified.

14. The method of claim 1, wherein generating a validation mark further comprises:

generating a combination validation mark/postage indicium, wherein the combination validation mark/postage indicium is applied to an envelope containing the absentee ballot.

15. The method of claim 1, wherein a first validation mark is applied to the absentee ballot and a second validation mark is applied to the envelope containing the absentee ballot.

16. The method of claim 15, wherein the first and second validation marks are identical.

17. A method for verifying a date associated with an absentee ballot comprising:

generating a validation mark with a vote validator device, the validation mark including an identification of the vote validator device and a date on which the validation mark was generated;

signing the validation mark with a digital signature;

applying the validation mark to at least one of the absentee ballot or an envelope containing the absentee ballot;

receiving the envelope containing the absentee ballot at a verification system;

scanning the validation mark;

obtaining an information record associated with the vote validator device based on the identification of the vote validator device in the scanned validation mark;

verifying the digital signature of the scanned validation mark; and if the digital signature is verified, verifying data from the scanned validation mark with data from the information record, wherein if the data from the scanned validation mark is verified, the date included in the scanned validation mark is verified.

18. The method of claim 17, wherein the validation mark further includes a unique identifier and the information record includes validation marks previously generated by the vote validator device that have already been verified, and wherein verifying the scanned validation mark further comprises:

comparing the unique identifier of the scanned validation mark with unique identifiers of validation marks previously generated by the vote validator device that have already been verified to determine if the unique identifier is a duplicate, wherein if the unique identifier is not a duplicate, the date included in the scanned validation mark is verified.

19. The method of claim 17, wherein the information record includes all validation marks generated by the vote validator device, and verifying the scanned validation mark further comprises:

determining if the scanned validation mark was previously generated by the vote validator device, wherein if the scanned validation mark was previously generated by the vote validator device, the date included in the scanned validation mark is verified.

20. The method of claim 17, wherein generating a validation mark further comprises:

generating a combination validation mark/postage indicium.

21. The method of claim 17, wherein the validation mark is applied to the absentee ballot, and the date signifies the date of completion of the absentee ballot.

22. The method of claim 17, wherein the validation mark is applied to the envelope containing the absentee ballot, and the date signifies the date the envelope containing the absentee ballot was submitted for return.

23. The method of claim 17, wherein obtaining an information record further comprises:

obtaining an information record from a data base.

24. The method of claim 17, wherein obtaining an information record further comprises:

obtaining an information record from the vote validator device.

25. A method for an election authority to process and validate a received absentee ballot comprising:

scanning a validation mark associated with the absentee ballot, the validation mark including data associated with the validation mark and a digital signature;

obtaining an information record associated with a vote validator device that generated the scanned validation mark;

verifying the digital signature of the scanned validation mark; and if the digital signature is verified, verifying data from the scanned validation mark with data from the information record, wherein if the data from the scanned validation mark is verified, the absentee ballot is validated.

26. The method of claim 25, wherein the validation mark is provided on the absentee ballot.

27. The method of claim 25, wherein the validation mark is provided on an envelope that contains the absentee ballot.

28. The method of claim 25, wherein the data associated with the validation mark includes a unique identifier and the information record includes validation marks previously generated by the vote validator device that have already been verified, and verifying the data from the scanned validation mark further comprises:

comparing the unique identifier of the scanned validation mark with unique identifiers of validation marks previously generated by the vote validator device that have already been verified to determine if the unique identifier of the scanned validation mark is a duplicate, wherein if the unique identifier of the scanned validation mark is not a duplicate, the data from the scanned validation mark is verified.

29. The method of claim 25, wherein the information record includes information associated with all validation marks generated by the vote validator device, and verifying the data from the scanned validation mark further comprises:

determining if the scanned validation mark was previously generated by the vote validator device, wherein if the scanned validation mark was previously generated by the vote validator device, the data from the scanned validation mark is verified.

30. A method of processing an absentee ballot for return to an election authority comprising:

generating a validation mark with a vote validator device, the validation mark authenticating a date of processing of the absentee ballot for return to the election authority;

signing the validation mark with a digital signature; and applying the validation mark to at least one of the absentee ballot or an envelope containing the absentee ballot.

31. The method of claim 30, wherein applying the validation mark further comprises:

printing the validation mark on at least one of the absentee ballot or the envelope containing the absentee ballot.

32. The method of claim 31, wherein the printed validation mark is provided with a graphical security property.

33. The method of claim 31, wherein printing the validation mark on the envelope containing the absentee ballot further comprises:

printing the validation mark across a sealed flap of the envelope.

34. The method of claim 30, wherein applying the validation mark further comprises:

printing the validation mark on a label for affixing to at least one of the absentee ballot or the envelope containing the absentee ballot.

35. The method of claim 30, wherein applying the validation mark further comprises:

applying a first validation mark to the absentee ballot; and applying a second validation mark to the envelope containing the absentee ballot.

36. The method of claim 35, wherein the first and second validation marks are identical.

37. The method of claim 30, wherein the validation mark includes an identification of the vote validator device, a unique identification number, and a date on which the validation mark was generated.

38. A vote validation system comprising:

a vote validator device to generate a validation mark associated with an absentee ballot, the validation mark including an identification of the vote validator device, a unique identification number, a date the validation mark was generated, and a digital signature, the vote validator device providing the validation mark on the absentee ballot or an envelope containing the absentee ballot, the validation mark authenticating a date of processing of the absentee ballot or the envelope containing the absentee ballot; and a verification system to verify the validation mark by scanning the validation mark, verifying the digital signature of the validation mark, and verifying at least a portion of data included in the validation mark, wherein if the at least a portion of the data included in the validation mark is verified, the absentee ballot is validated.

39. The vote validation system of claim 38, further comprising:

a data base to store at least one record associated with the vote validator device, the record including information associated with the vote validator device, wherein the verification system communicates with the data base to obtain the at least one record associated with the vote validator device to verify the validation mark.

40. The vote validation system of claim 39, wherein the verification system further comprises:

a management system to compare data included in an audit report generated by the vote validator device with data included in the at least one record associated with the vote validator device that is stored in the data base.

41. A vote validator device for processing an absentee ballot comprising:

a processing unit to generate a validation mark associated with the absentee ballot, an accounting system coupled to the processing unit, the accounting system generating a unique identification number for the validation mark, the unique identification number being included in the validation mark;

a memory device coupled to the processing unit, the memory device storing information related to the vote validator device and a cryptographic key;

an encryption device coupled to the processing unit, the encryption device generating a digital signature for the validation mark utilizing the cryptographic key, the digital signature being included in the validation mark;

a clock to provide a date when the validation mark was generated, the date being included in the validation mark; and a printer coupled to the processor to print the validation mark on the absentee ballot or an envelope containing the absentee ballot, wherein the validation mark authenticates the date of processing the absentee ballot or the envelope containing the absentee ballot.

42. The vote validator device of claim 41, further comprising:

a communication system coupling the vote validator device with a data base, the data base storing at least one record associated with the vote validator device.

43. The vote validator device of claim 41, further comprising:

a postage meter coupled to the printer, wherein the postage meter generates a postage indicium that is printed by the printer on the envelope containing the absentee ballot.

44. The vote validator device of claim 43, wherein the validation mark is combined with the postage indicium.

45. The vote validator device of claim 41, wherein the printer is coupled to the processor via a secure link.

46. The vote validator device of claim 41, wherein the clock is external to the vote validator device.

47. A system for an election authority to process and validate a received absentee ballot comprising:

means for scanning a validation mark associated with the absentee ballot, the validation mark including data associated with the validation mark and a digital signature;

means for obtaining an information record associated with a vote validator device that generated the scanned validation mark;

means for verifying the digital signature of the scanned validation mark; and if the digital signature is verified, means for verifying data from the scanned validation mark with data from the information record, wherein if the data from the scanned validation mark is verified, the absentee ballot is validated.

48. The system of claim 47, wherein the validation mark is provided on the absentee ballot.

49. The system of claim 47, wherein the validation mark is provided on an envelope that contains the absentee ballot.

50. The system of claim 47, wherein the data associated with the validation mark includes a unique identifier and the information record includes validation marks previously generated by the vote validator device that have already been verified, and the means for verifying the data from the scanned validation mark further comprises:

means for comparing the unique identifier of the scanned validation mark with unique identifiers of validation marks previously generated by the vote validator device that have already been verified to determine if the unique identifier of the scanned validation mark is a duplicate, wherein if the unique identifier of the scanned validation mark is not a duplicate, the data from the scanned validation mark is verified.

51. The system of claim 47, wherein the information record includes all validation marks generated by the vote validator device, and the means for verifying the data from the scanned validation mark further comprises:

means for determining if the scanned validation mark was previously generated by the vote validator device, wherein if the scanned validation mark was previously generated by the vote validator device, the data from the scanned validation mark is verified.

* * * * *